United States Patent [19]

Hargreaves

[11] Patent Number: 5,610,602
[45] Date of Patent: Mar. 11, 1997

[54] KEYBOARD AND METHOD FOR PRODUCING

[75] Inventor: William R. Hargreaves, Bellevue, Wash.

[73] Assignee: Kinesis Corporation, Bothell, Wash.

[21] Appl. No.: 548,512

[22] Filed: Jun. 7, 1995

Related U.S. Application Data

[63] Continuation of Ser. No. 931,736, Aug. 18, 1992, abandoned.

[51] Int. Cl.$^6$ .................................................. H03K 17/94
[52] U.S. Cl. ........................... 341/22; 400/488; 400/495; 200/5 A; 361/680; 361/749
[58] Field of Search ................................. 341/20, 21, 22, 341/34; 345/168; 400/472, 488, 489, 473, 477, 479, 486, 490, 492, 495; 235/145 R; D14/100, 114, 115; D18/12; 200/5 A; 361/680, 749

[56] References Cited

U.S. PATENT DOCUMENTS

| | | | |
|---|---|---|---|
| D. 287,854 | 1/1987 | Crews | D14/100 |
| 1,395,049 | 10/1921 | McNamara . | |
| 1,652,464 | 2/1926 | Tyberg . | |
| 2,040,248 | 5/1936 | Dvorak et al. . | |
| 3,022,878 | 2/1962 | Seibel et al. | 197/19 |
| 3,663,733 | 5/1972 | Murakami | 84/1.01 |
| 3,805,939 | 4/1974 | Ross | 197/19 |
| 3,911,234 | 10/1975 | Kotaka | 200/5 A |
| 3,929,216 | 12/1975 | Einbinder | 197/100 |
| 3,940,758 | 2/1976 | Margolin | 340/337 |
| 3,945,482 | 3/1976 | Einbinder | 197/100 |
| 3,990,565 | 11/1976 | Felton | 197/98 |
| 4,081,068 | 3/1978 | Zapp | 197/98 |
| 4,244,659 | 1/1981 | Malt | 400/486 |
| 4,378,553 | 3/1983 | McCall | 341/22 |
| 4,440,515 | 4/1984 | Nassimbene | 400/479 |
| 4,467,321 | 8/1984 | Volnak | 341/22 |
| 4,509,873 | 4/1985 | Ryan | 400/489 |
| 4,522,518 | 6/1985 | Schmidt | 400/486 |
| 4,579,470 | 4/1986 | Casey | 400/489 |
| 4,597,681 | 7/1986 | Hodges | 400/488 |
| 4,613,247 | 9/1986 | McGunnigle | 400/486 |
| 4,615,629 | 10/1986 | Power | 400/486 |
| 4,655,621 | 4/1987 | Holden | 400/100 |
| 4,679,030 | 7/1987 | Volnak | 341/22 |
| 4,680,572 | 7/1987 | Meguire et al. | 341/22 |
| 4,686,408 | 8/1987 | Ishiyama | 310/334 |

(List continued on next page.)

FOREIGN PATENT DOCUMENTS

| | | |
|---|---|---|
| 1279693 | 9/1963 | Germany . |
| 1016993 | 1/1966 | United Kingdom . |
| 2000083 | 1/1979 | United Kingdom . |
| 2090561 | 7/1982 | United Kingdom .............. B41J 5/10 |
| 2181096 | 4/1987 | United Kingdom . |
| 89/06600 | 7/1989 | WIPO . |

OTHER PUBLICATIONS

Technology Design, Inc., "Design Front".
IBM Technical Disclosure Bulletin, vol. 25, No. 7A, Dec., 1982, pp. 3300–3302.

(List continued on next page.)

*Primary Examiner*—Jeffery Hofsass
*Assistant Examiner*—Andrew Hill
*Attorney, Agent, or Firm*—Bogle & Gates P.L.L.C.

[57] ABSTRACT

A keyboard having an array of non-planar keys and a method for manufacturing such a keyboard is provided. In one embodiment, the non-planar array is a double-convex array. Electrical connection along the keys and/or from the keys to associated electronics is provided by way of a circuit board. The circuit board has a geometry and flexibility which permits the circuit board to conform to a shape which is non-planar along two non-parallel axes. In one embodiment, the circuit board can be configured in a double-concave shape. The circuit board includes one or more slots defining two or more projections. These projections can be placed in a configured non-coplanar configuration along a first axis and the circuit board can be flexed to a non-planar configuration along a second non-parallel axis.

33 Claims, 6 Drawing Sheets

U.S. PATENT DOCUMENTS

| | | | |
|---|---|---|---|
| 4,715,736 | 12/1987 | McGunningle | 400/484 |
| 4,734,963 | 4/1988 | Ishiyama | 29/25.35 |
| 4,735,520 | 4/1988 | Suzuki et al. | 400/488 |
| 4,791,526 | 12/1988 | Breu et al. | 361/398 |
| 4,824,268 | 4/1989 | Diernisse | 400/486 |
| 4,833,446 | 5/1989 | Eilam et al. | 341/22 |
| 4,836,700 | 6/1989 | Jensen | 400/489 |
| 4,897,649 | 1/1990 | Stucki | 341/22 |
| 4,913,573 | 4/1990 | Retter | 400/489 |
| 4,917,516 | 4/1990 | Retter | 400/489 |
| 4,920,342 | 4/1990 | Gratke | 341/22 |
| 4,974,183 | 11/1990 | Miller | 364/709.12 |
| 5,017,030 | 5/1991 | Crews | 400/485 |
| 5,044,053 | 9/1991 | Kopel et al. | 29/25.35 |
| 5,091,771 | 2/1992 | Bolan et al. | 357/74 |
| 5,260,512 | 11/1993 | Chomette et al. | 84/644 |

OTHER PUBLICATIONS

Kroemer, K., "Human Engineering the Keyboard", *Human Factors,* 14(1) 51–63, 1972.

Conway, D. L., "Contoured Keyboard", *IBM Technical Disclosure Bulletin,* 22(3) 1276–77 (1979).

Snyder, H., "Ergonomic Principles in Office Automation," Chapter on *Keyboard Design,* published by Ericsson Information Systems, Sweden; pp. 43–57, 1983.

Zipp, et al., "Keyboard Design Through Physiological Strain Measurements," *Applied Ergonomics,* pp. 117–122, Jun., 1983.

James, S., "Carpal Tunnel Syndrome," *Issues of Injury,* vol. 1, No. 1, pub. by Medical Consultants Northwest, Inc., pp. 1–6, May, 1987.

Heyer, et al., "University of Washington Study of Video Display Terminal Workers" Appendicies D, E & F, Feb., 1989.

"Safeskin" product adverstisement from *PC Magazine,* 8:4, 86 (1989).

"PC Brand Computer" advertisement from *PC Magazine,* 8:2 178 (1989).

"TDA Template" advertisement, from *Personal Computing,* 13:2 236–37 (1989).

Thompson, et al., "Analysis of the Tony! Variable Geometry VDT Keyboard ", *Proceedings of the Human Factors Society 34th Annual Meeting,* pp. 365–369, 1990.

"Upper Limb Ergonomic Stressors in Selected Newspaper Jobs, A Pilot Study", Univ. of Michigan and Nat'l Inst. of Ocuppational Safety & Health, pp. 1–43, 1990.

Safety & Health Assessment and Research Program, "Cumulative Trauma Disorders in Claims Initiation, Baseline Findings", Wash. DL&I, pp. 1–13 and 3 sheets of drawings, Jan. 7, 1991.

Franklin, et al., "Occupational Carpal Tunnel Syndrome in Washington State, 1984–1988," *American Journal of Public Health,* 81:6, 741–746, Jun., 1991.

"Technical Reference", sections 1, 4 & 5, *IBM Personal Computer Hardware Reference Library,* Sep., 1975 (first edition).

FIG. 9B

KEYBOARD AND METHOD FOR PRODUCING

This is a continuation of application Ser. No. 07/931,736 filed Aug. 18, 1992, now abandoned, incorporated herein by reference.

The present invention relates to an ergonomic keyboard with non-planar keys and a method of producing the keyboard, and in particular to a keyboard with a circuit board for providing electrical connection to non-planar keys.

BACKGROUND OF THE INVENTION

A number of attempts have been made to provide ergonomically-designed keyboards, e.g. to reduce fatigue and injury and/or to increase operation speed. One example is described in U.S. patent application 07/683,980, filed Apr. 10, 1991 by Hargreaves, et al., now abandoned, commonly assigned herewith and incorporated herein by reference. In several ergonomic designs, at least some of the keys of the keyboard are positioned in a non-planar fashion. In at least one design, the keys are non-planar along at least two non-parallel axes, e.g., such as to provide a double-concave or bowl-shaped key array.

Although such ergonomic designs provide benefits to the user, it has been found relatively expensive to manufacture such keyboards in the past. At least part of the expense relates to non-planar, and particularly, double-concave configurations of a key array. Specifically, past designs have not provided for cost-effective electrical connection to the various key switches in the key array. Typically, previous ergonomic keyboards used individual wiring for connecting some or all of the keys in a non-planar key array. In one example of the individual wiring, individual wires are hand-soldered to each pin of each key switch and coupled at the opposite end to, e.g., a junction, for connection to a bus or cable. Such individual wiring is not only expensive to achieve, but time-consuming, prone to error, and not conducive to automation.

Accordingly, it would be advantageous to provide an ergonomic keyboard, e.g., having a double-concave key array which does not require individual wiring to the keys thereof.

SUMMARY OF THE INVENTION

The present invention includes the recognition of problems found in the prior art. According to the present invention, a circuit board is provided which can be placed in a configuration which is non-planar along at least two non-parallel axes. In one embodiment, a thin circuit board has a geometric pattern which allows it to conform to a surface which is concave in two directions. The geometric pattern, in one embodiment, includes providing one or more slots to define at least two regions of the circuit board that can be independently positioned in mutually non-coplanar configurations. Preferably, the circuit board is flexible or semi-flexible, allowing it to conform to a concave surface.

Although flexible circuit boards have been previously known, such circuit boards typically could be curved only along one axis in any given region of the board. In previous flexible circuit boards, curving a region of the circuit board along one axis precluded substantial curvature of the same region across a different axis, such as an orthogonal axis, without risking kinking of the board and possible resultant damage to the circuitry thereon. In one embodiment, the present invention provides a flexible circuit board having a hand-like shape. The flexible circuit board in this embodiment has a first palm region and four slots defining five flat finger-like projections extending outward therefrom. In this way, the circuit board can be curved along a first cross-palm direction and one or more of the fingers can be curved in a second direction such as along the axis of the projection.

By providing a circuit board which can conform to a surface that is concave in two directions, a single circuit board can be used to provide electrical connections to a plurality of key switches in a non-planar key array without requiring individual wiring to the key switches, thus providing an economic, rapid and reliable method for manufacturing ergonomic keyboards.

DETAILED DESCRIPTION OF THE PREFERRED EMBODIMENT

Figure 1:
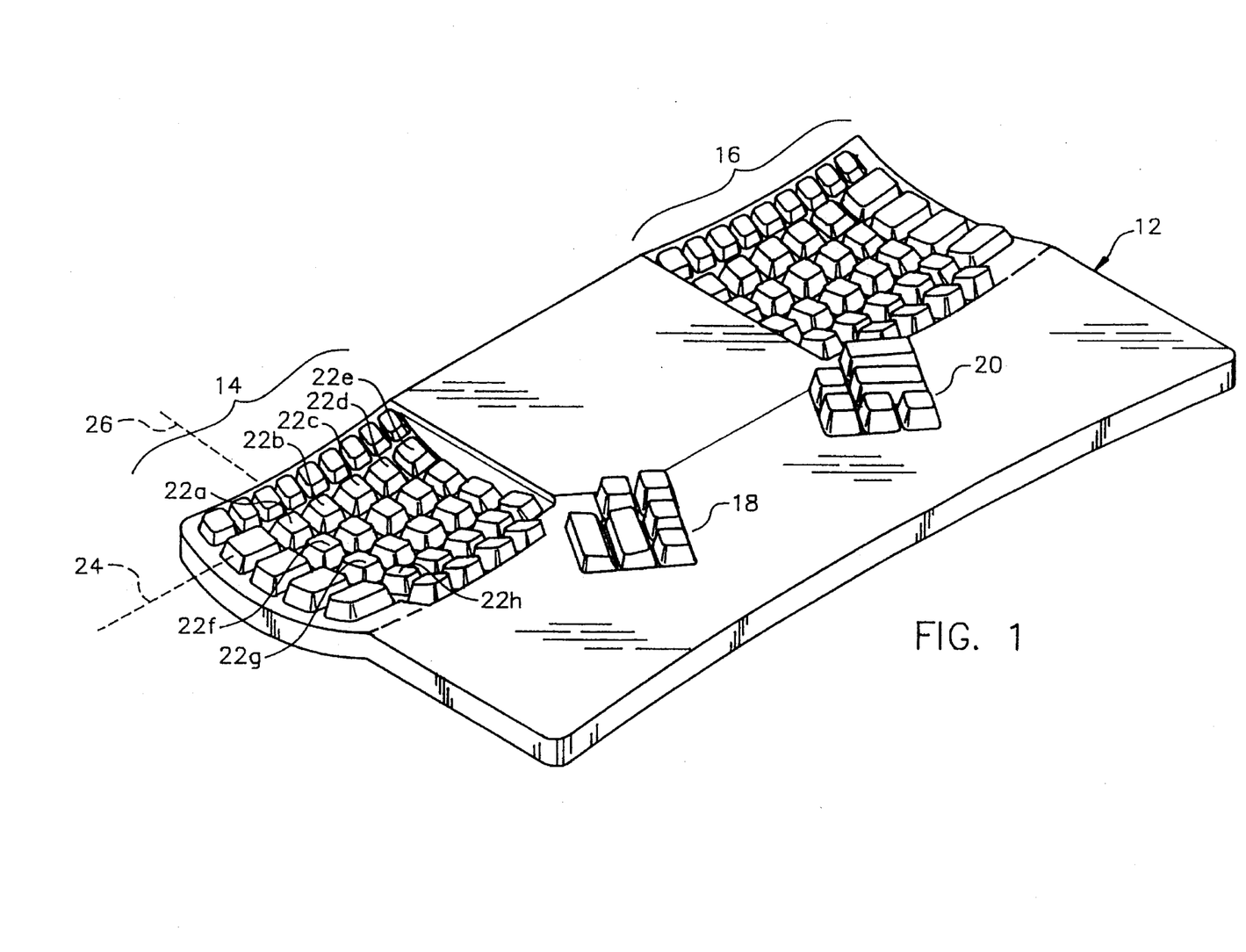
FIG. 1 is a perspective view of a keyboard according to one embodiment of the invention.

As depicted in FIG. 1, a keyboard 12 includes a first plurality of keys 14 configured in a non-planar array. In the embodiment of FIG. 1, the keyboard also contains a second non-planar array of keys 16 and additional key arrays 18, 20. Details of one suitable key arrangement are described in U.S. patent application 07/683,980, filed Apr. 10, 1991 by Hargreaves, et al., commonly assigned herewith and incorporated herein by reference. As is known in the art, the keyboard 12 may also contain indicator lights, adjustable feet, and/or an input/output (I/O) cable or coupler (not shown).

In the embodiment of FIG. 1, the keys of the first array 14 are substantially positioned in rows and columns, although other positions of the keys are possible as known to those of skill in the art. In the embodiment depicted in FIG. 1, at least some of the keys in the array 14 are non-planar along at least two non-parallel axes. For example, individual keys 22a–22e lie substantially along a first axis 24 (more precisely, along a vertical plane passing through axis 24) and are non-coplanar along the axis 24. The keys are non-coplanar because the user-activation surface, i.e., the keytops, do not lie in a single plane and because the activation directions, (preferably substantially perpendicular to the keytops) are non-parallel to one another.

In addition to a row of keys, 22a–22e, being non-planar, the keys are also non-planar in a column direction. For example, individual keys 22a, 22f, 22g, 22h lie substantially along an axis 26 (more precisely, along a vertical plane passing through axis 26) and are non-coplanar along this axis. The axis 26 is non-parallel to the axis 24 and, in the embodiment of FIG. 1, is substantially perpendicular thereto.

Figure 2:
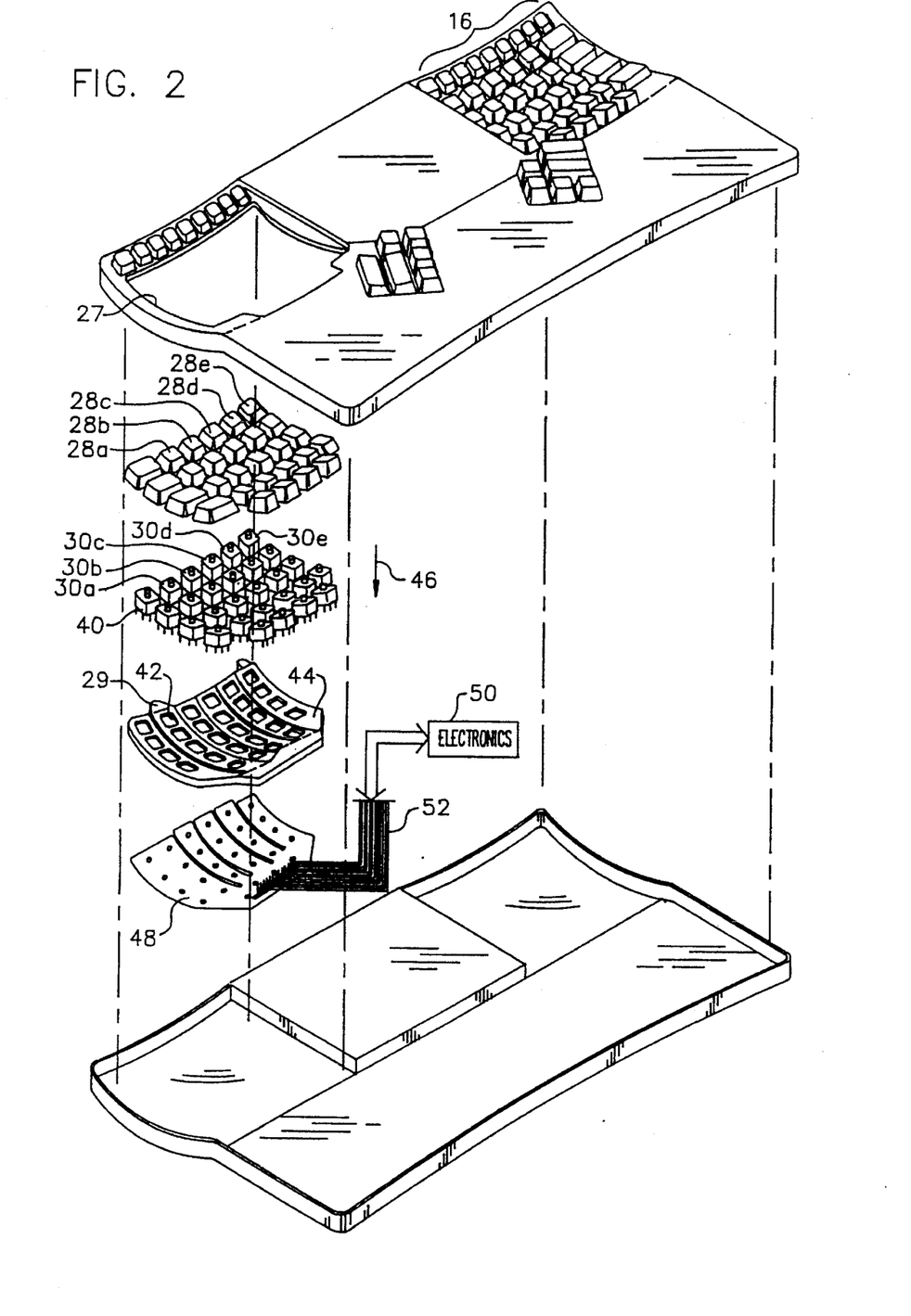
FIG. 2 is a partially exploded view of the keyboard of FIG. 1 showing electronics in block form.
Figures 6, 10:
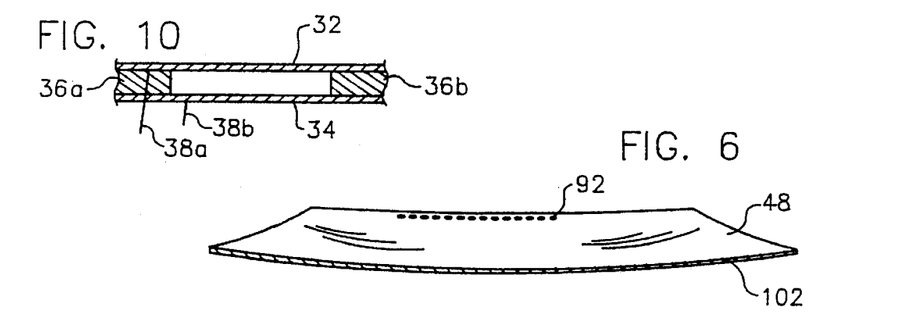
FIG. 6 is a cross-sectional view taken along line 6—6 of FIG. 5.
FIG. 10 is a cross-section of a membrane switch.

FIG. 2 provides an exploded view of one 14 of the two concave key arrays. The second concave key array 16 preferably is also formed in the same fashion as the first array 14, i.e. as depicted in the left portion of FIG. 2. As seen in FIG. 2, the individual keys 22 can be provided in two mateable portions, namely, a key cover and a key switch. For example, key 22a can be formed from key cover 28a and key switch 30a. Although FIG. 2 depicts mechanical key switches, other types of key switches well-known in the art can also be used, such as membrane keys. As depicted in FIG. 10, a membrane key can include a deformable membrane 32 spaced from a contact surface 34 by spacers 36a, 36b. The membrane 32 and contact surface 34 are either electrically conductive or have conductive components placed on their facing surfaces. Deflection of the membrane 32 to place it into contact with the contact surface 34, such as by finger pressure by a user, provides an electrical contact which can be detected as a key closure, e.g., by measuring current or voltage across electrical contacts 38a, 38b.

When mechanical switches 30a–30e are used, detection of a key press is performed using electrical contacts 40. A number of mechanical switches can be used. One type of mechanical key switch that can be used is type MX1A available from Cherry Electronics Corporation, Waukeegan Ill.

In the embodiment of FIG. 2, the keys are held in holes 42 formed in a plate 44. The plate 44 has a double concave shape which establishes the double-concave configuration of the keys, described above. The plate 44 is mountable in an opening 27 in the chassis 80, e.g., using tabs 29. In the embodiment of FIG. 2, the key switches 40 are inserted into the plate 44 in a direction 46 which is toward the interior of the keyboard 12. In one embodiment, the key switches 30 include adaptations such as tabs, slots or latches for connecting the key switches 30 to the plate 44 by engagement with the edges of the holes 42, preferably by a snap action.

The key caps 28, plate 44 and chassis 80 can be made from a number of materials. Preferably, high-impact plastic is used, although it would also be possible to use other materials such as metal, composites, fiberglass and the like.

When the switches 30 and plate 44 are assembled, the contacts 40 protrude downward from the bottom surface of the plate 44. A circuit board 48 provides electrical connection between the electrical contacts 40, for ultimate coupling with electronics 50, e.g., via a bus 52 (as described more fully below).

The present invention can be used in connection with a number of types of keyboards for a number of purposes. One example is a keyboard for use with a computer, such as that described in "Personal Computer AT Technical Reference", *IBM Hardware Reference Publication* 6139362/6280070 (1985). Briefly, according to one embodiment, the key matrix 54 (FIG. 3) is coupled, via a bus 52a through a sense amplifier 56 to a keyboard controller and scan code buffer microcomputer 58. The microcomputer 58 scans the key matrix 54 via a buffer 60 and NOR gates 62. The microcomputer 58 outputs scan codes and receives clock and data signals via the keyboard buffer 64. A J22-type connector 66 is used for communicating with the system board of the computer over a cable (not shown). The microcomputer 58, via invertor circuit 68, controls the status of indicator lights 70a, 70b, 70c.

Figure 3:
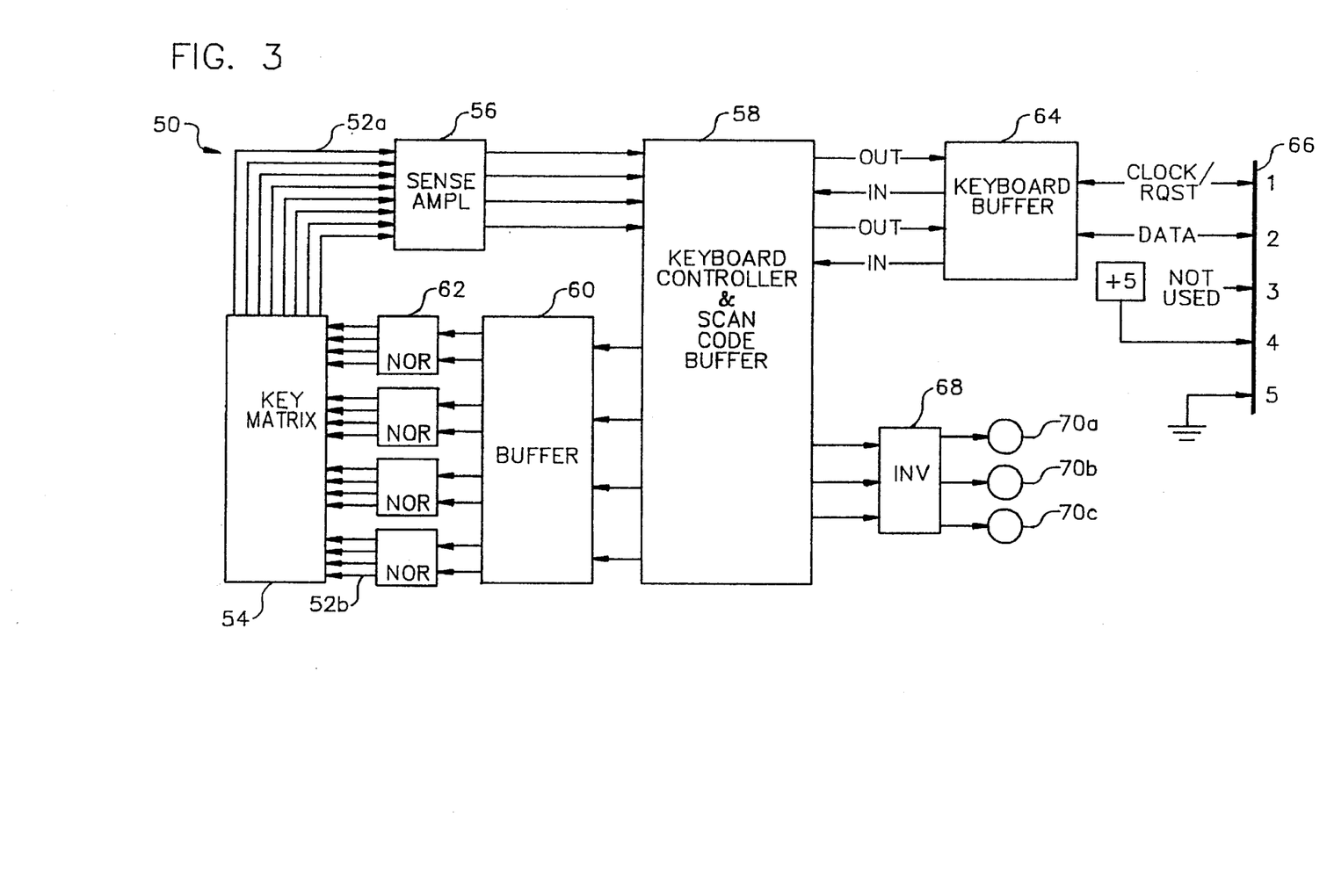
FIG. 3 is a block diagram showing an example of electronic components that can be used in a keyboard of the present invention.

Although the electronics depicted in FIG. 3 are described in connection with an AT-type keyboard, the present invention can be used with other types of keyboards, including a PC/XT-type keyboard, a Macintosh-type keyboard as well as keyboards provided for purposes other than computer I/O, such as keyboards for games or other amusements, musical instruments, vehicle, weaponry, machinery or other equipment control and the like.

Figure 4:
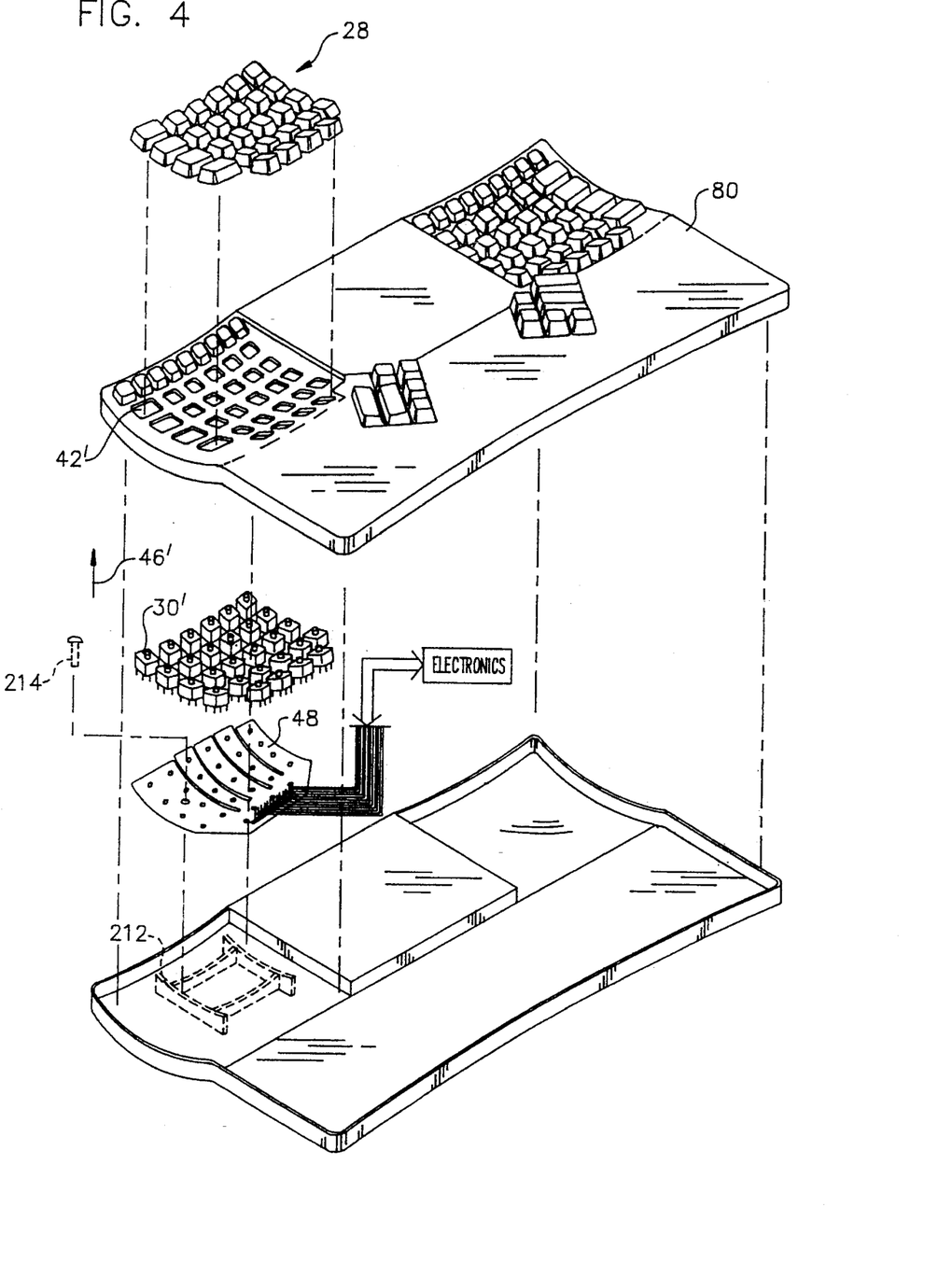
FIG. 4 is a partially exploded view of a keyboard according to another embodiment of the present invention.
Figure 5:
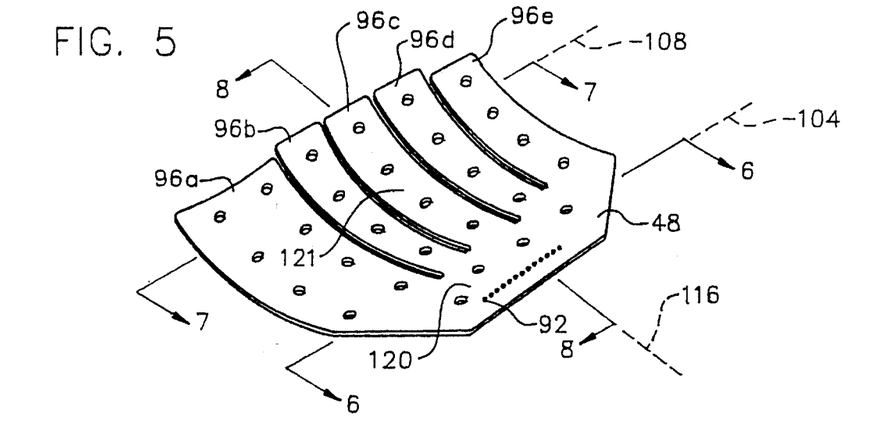
FIG. 5 is a perspective view of a circuit board according to one embodiment of the present invention.

FIG. 4 depicts another embodiment of the present invention which the holes 42' for receiving the key switches 30' are formed in the chassis or case 80 of the keyboard, thus eliminating the need for a separate non-integral plate 44. FIG. 4 also illustrates an embodiment in which the key switches 30' can be inserted through the holes 42' in a direction 46' opposite to the direction of insertion 42 illustrated in FIG. 2, i.e., in a direction from the bottom or interior surface of the chassis top 80 toward the top or exterior surface. An advantage of this configuration is that it would allow the key switches 30' to be attached to the circuit board 48 while the circuit board is in a flat configuration, e.g. before the keys are placed in the concave configuration by insertion through the holes 42'. Coupling the key switches to a flat-configured circuit board is less labor-intensive than coupling to a curved circuit board or simultaneously flexing and coupling the circuit board (which are among techniques that can be used, e.g. in connection with the embodiment of FIG. 2). Furthermore, coupling to a flat-configured circuit board can employ, e.g., wave-soldering so as to be more easily automated, i.e. performed by machine, without substantial human intervention, than coupling to a curved circuit board (although some degree of automation is possible with the curved configuration).

In another embodiment, which is particularly advantageous when used in conjunction with the flat-configuration coupling described above, the circuit board 48 can be supported from below, e.g. by upright blades 212 depicted in phantom in FIG. 4. The upright blades 212 can be formed of a number of materials, including metal, fiberglass, and composites, and preferably are formed of the same material as the chassis or case, 80 and are formed integrally therewith, such as by a molding process. In this embodiment, it is possible to use the blades 212 to position the circuit board 48 (and attached switches 30) in the desired configuration, such as a double-concave configuration, e.g by attachment with one or more fastening devices such as screws 214. Other fastening means such as latches, tabs, adhesives and the like can also be used. When the blades 212 are used to shape the circuit board and switches, it is possible to dispense with the array of holes 42, so that the user can access all the keys in the array through a single large opening, similar to opening 27 depicted in FIG. 2. It is currently believed that for this embodiment, it is useful to provide a circuit board which has somewhat greater rigidity than the circuit board used in connection with plate-supported key switches.

Figure 9A:
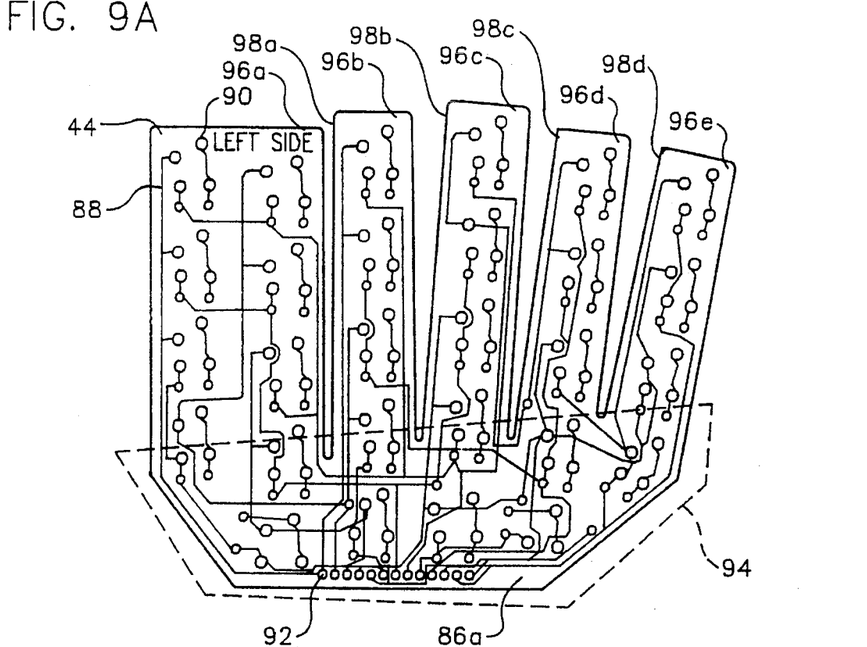
FIGS. 9A and 9B depict circuit boards according to one embodiment of the present invention.
Figure 9B:
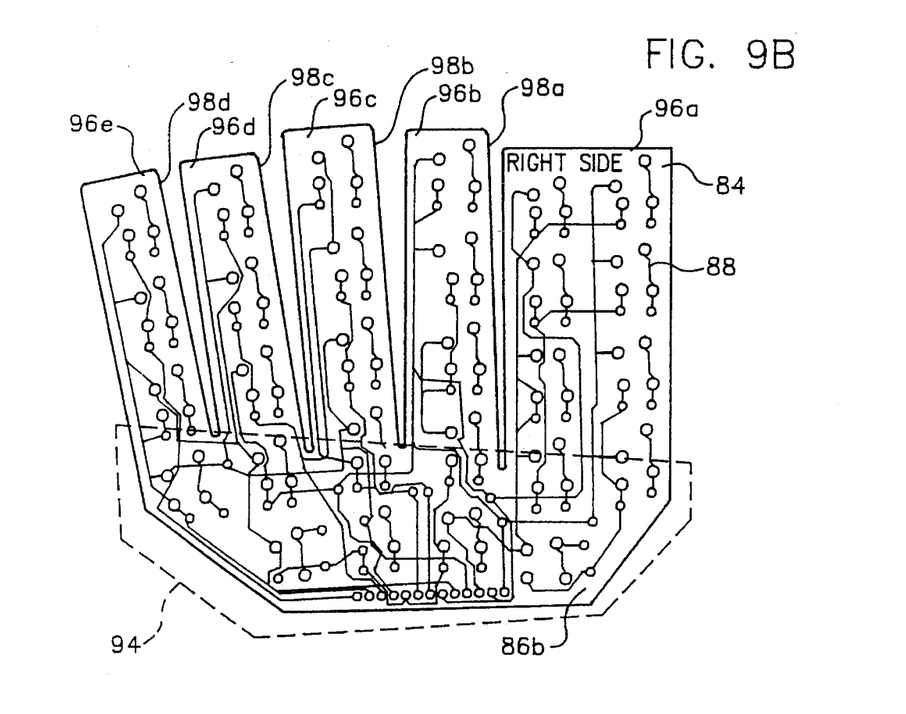

FIGS. 9A and 9B depict the circuit boards 48, 84 used in forming electrical connections to the key arrays 14, 16 of the embodiment of FIG. 1. In the depicted embodiment, circuit boards 48, 84 are substantially mirror images of each other. Each of the circuit boards 48, 84 includes a substrate 86a, 86b. The substrate is preferably flexible to permit bending of the substrate. A number of materials can be used for the substrate 86 including fiberglass, such as FR4 fiberglass, a polyester film such as that sold under the tradename Mylar®, and available from E. I. Dupont de Nemours and Company, Wilmington, Del. and/or a composite such as a reinforced epoxy resin composite like those sold under the trademark BEND/flex™, available from Rogers Corporation, Rogers, Conn.

The substrate 86 is preferably thin. For example, when FR4 fiberglass is used, the substrate preferably has a thickness between about 0.005 and 0.02 inches (about 0.13 mm to about 0.5 mm) preferably about 0.009 to about 0.011 inches (about 0.23 mm to about 0.28 mm) and most preferably about 0.01 inches (about 0.25 mm).

The circuit boards 86 preferably include a plurality of electrically conductive traces 88. In one embodiment, traces are provided on the substrate 86 by printing in a manner well known in the art. The traces can be formed by a plurality of materials including copper, aluminum, gold and similar conductive materials or alloys thereof. By printing on both surfaces, traces can be provided which cross over each other without providing electrical contact of the cross over points. FIGS. 9A and 9B depict the traces which are formed on both surfaces of the substrate 86. The substrate 86 includes one or more holes 90 for receiving the electrical contacts 40 of the key switches 30. Preferably, the holes 90 are surrounded by conductive material in contact with the traces 88. This configuration provides for, e.g., a solder connection in a manner well-known in the art. Alternatively, the substrates 86a, 86b can be configured for other types of electrical connection with the electrical contacts 40, such as surface-mount connection and solderless connections, using methods and configurations well-known in the art. Substrates 86 are also provided with connectors (e.g., conductive-surrounded holes) 92 for connection with the bus 52. The substrate 86a may also be provided with holes or projections for other purposes such as alignment or attachment.

In the embodiment of FIGS. 9A and 9B, the circuit boards 48, 84 contain a first region or portion 94 which is substantially integral. Projecting outward therefrom are five flat finger-like projections 96a–96e. Each of the projections 96a–96e contain traces 88 running from the projection into the first region 94. The projections 96a–96e are separated from one another by slots 98a–98d. In the depicted embodiments, the slots 98a–98d assist in permitting the substrate to be curved, in a given region of the substrate, along two non-parallel axes.

Figure 7:
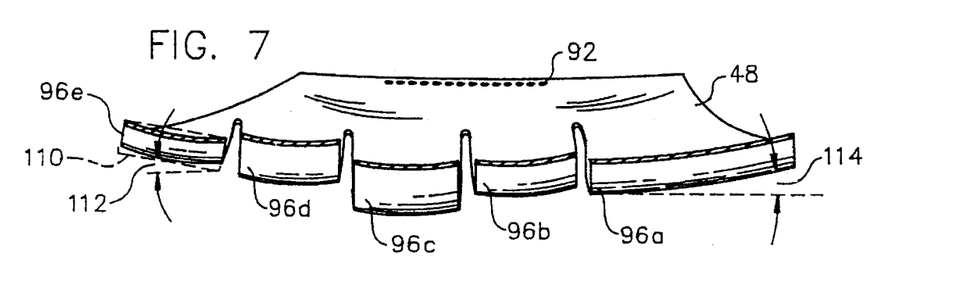
FIG. 7 is a cross-sectional view taken along line 7—7 of FIG. 5.

Curvature along two non-parallel axes, according to one embodiment of the invention, is depicted in FIGS. 5–8. As shown in FIG. 6, the cross-sectional edge 102 of the substrate 48 taken along a first axis 104 (strictly speaking, along a vertical plane lying along axis 104) is non-planar along the axis 104. In particular, it is non-planar by being curved. The non-planar configuration along a substantially parallel axis 108 is depicted in FIG. 7. In the embodiment depicted in FIG. 7, each of the projections 96a–96e is non-planar by being curved along the axis 108. However, even in an embodiment in which the projections 96a–96e are not curved along the axis 108, e.g., as depicted by the phantom lines 110, the substrate 48 would be non-planar along this axis 108 by virtue of the different inclinations 112, 114 of the projections 96a, 96e (e.g., with respect to a horizontal plane).

Figure 8:
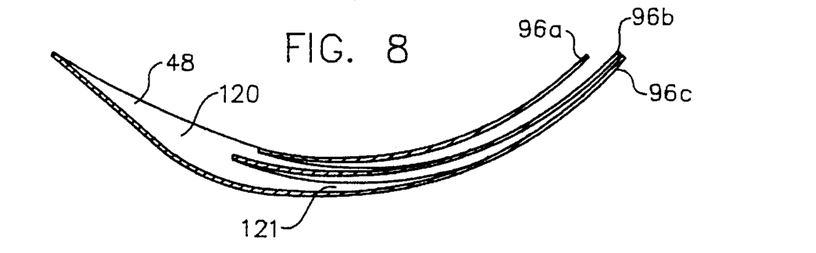
FIG. 8 is a cross-sectional view taken along line 8—8 of FIG. 5.

As depicted in FIG. 8, the substrate 48 is also non-planar along an axis 116 which is non-parallel to axis 104. The substrate 44 is non-planar along axis 116 (strictly speaking, along a vertical plane lying along axis 116) by being curved along this axis. Thus, as seen in FIGS. 6 and 8, the substrate 48 is double-concave since, in at least one area, e.g., 120, it is simultaneously non-planar along two non-parallel (and, in fact, substantially perpendicular) axes 104, 116. In the depicted embodiment, the substrate 48 is also simultaneously non-planar in region 121 along non-parallel axes 108, 116. In the embodiment of FIG. 8, the finger-like projections 96a, 96b, 96c are each curved along the longitudinal axes of the projections, to form arcs. Each arc is different, e.g., having a different radius of curvature.

According to one embodiment of the invention, the keyboard 12 can be provided in the following manner. The key switches 30 are inserted through the holes 42 of a double concave plate 44 in a first direction 46. Following insertion of the switches, the holes 90 of the circuit board 48 are aligned with the electrical contacts 40. The contacts 40 are connected to the circuit board 48 by soldering. As the circuit board 48 is soldered to the connectors 40, the circuit board 48 conforms to the double-concave curvature of the array of the contacts 40 (which is determined by the double-concave curvature of the plate 44). In one embodiment, the circuit board 48 is positioned adjacent to and conforming to the lower surface of the plate 44. In the depicted embodiment, conformance along axis 108 is accommodated by the existence of the slots 98a–98d, e.g., permitting the projections 98a,98e to be configured at different inclinations 112, 114. In addition to the different inclinations 112, 114, each of the projections 98a–98e may also assume a curved configuration as depicted in FIG. 7. Curvature along the orthongonal axis 116 is accommodated by the flexible nature of the circuit board 48. Thus, the circuit board 48 has sufficient flexibility to permit bending to a configuration such as that depicted in FIG. 8 without kinking, pleating, or damage to the traces 88 formed thereon.

The circuit board 48 is connected to a bus 52 e.g., using holes 92, to provide for electrical communication with the electronics 50. The plate 44 is mounted in the opening 27 and the key caps 28 are mated with the key switches 30.

In light of the above description, a number of advantages of the present invention can be seen. The present invention provides for ease of manufacture of non-planar keyboards such as double-concave keyboards. The present invention improves reliability by substituting printed circuits for individual wiring. The present reduces the time required for assembly of a keyboard and increases the potential for automation in keyboard assembly.

The present invention is also useful in permitting the use of thin, cost-effective materials for the device in which the switch-receiving holes 42 are formed, such as a plate 44. It is useful to form the plate 44 from an easily-formable material such as ABS plastic rather than, for example, metal, since it is difficult and expensive to form a double-concave shape from metal. However, many types of switches 30 are configured to engage the edges of holes 42 formed in the plate having a predefined thickness, such as 0.06 inches (about 1.5 mm). In the prior art this did not create problems since holes 42 were typically formed in flat plates which could be easily formed of metal. However, in the present configuration, when, e.g., ABS plastic is used to form the plate 44, if the ABS plastic is formed with a thickness to easily engage the switches 30, such as a thickness of 0.06 inches (about 1.5 mm), the plate 44 will have less rigidity than a corresponding metal plate and may not be able to retain the switches 30 with the degree of stability preferred by most users. The present invention, however, provides a brace for the plate 44 in the form of the circuit board 48. It has been found that when the circuit board 48 is coupled to the plate 44 via the mutual coupling of the circuit board 48 and plate 44 to the keys 30, the circuit board 48 provides sufficient bracing or support to the plate 44 that the key switches 30 are held in a sufficiently stable position despite using relatively thin material (such as 0.06 inch material) needed for efficient and effective engagement with the switches 30 and even when the plate 44 is made from a non-metallic material.

A number of variations and modifications of the invention can also be used. A keyboard can be provided with more or fewer key arrays and/or more or fewer keys than those depicted. The key configuration can be other than in rows and columns such as diagonally offset, curvi-linear and the like. Other types of non-planar key arrays can be provided such as double-convex or concave/convex. The plate 44 can be formed integral with the chassis 80 rather than being separately formed and attached thereto. Keys can be provided as a unitary device as well as separate key switches and key caps.

Although the present invention has been described by way of a preferred embodiment and certain variations and modifications, other variations and modifications can also be used, the invention being defined by the following claims.

What is claimed is:

1. A keyboard comprising:

a key-switch support having a first region defining a plurality of holes for engaging and supporting key-switches, said first region being bowl-shaped;

a plurality of key-switches disposed in said holes, each switch having electrical contacts on a bottom surface thereof, to provide a substantially bowl-shaped array of said electrical contacts; and a circuit board coupled to said contacts, said circuit board being flexible to permit the board to be bent, in a first region of the board, along a first axis and said circuit board having a plurality of slots defining two or more fingers to permit said first region of the board to be shaped in a non-planar configuration along a second, substantially perpendicular axis, substantially in the absence of overlapping of said fingers, wherein at least said first region of the circuit board is substantially bowl-shaped and substantially conformed to the shape of said bowl-shaped array of electrical contacts.

2. A keyboard comprising:

a plate having at least a first plurality of key-switches mounted thereon, each of said first plurality of key switches having a user-activatable surface and an opposite surface, said opposite surfaces of said key switches having electrical contacts, said contacts forming an array which is non-planar along at least two non-parallel axes;

a circuit board having a plurality of substantially non-contacting finger regions and having a plurality of substantially conductive traces, said circuit board positioned adjacent said array of electrical contacts, to form electrical paths from said contacts to said traces.

3. A keyboard, as claimed in claim 2, further comprising:

electronics for converting a keypress into an electrical signal; and a bus connecting said circuit board to said electronics.

4. A keyboard, comprising:

an upper and lower shell, having at least first and second openings in said upper shell;

first and second bowl-shaped plates positioned in said first and second openings, said first and second plates each having a plurality of holes configured to accommodate key switches;

a plurality of key switches positioned in said holes of said first and second plates, each key switch having an user-activatable upper surface and an opposite lower surface, with at least one electrical contact on said lower surface;

said holes of each of said first and second plates arranged to position said key switches in at least five groups, each group configured to place the upper surface of said key switches in said group in a concave configuration;

a flexible circuit board having a plurality of conductive traces printed thereon and having a first integral region and at least five finger-like projections extending outward from said first region said flexible circuit board mounted in a bowl-like configuration;

each of said five projections positioned in substantially non-overlapping fashion to couple the electrical contacts of the key switches of one of said five groups of key switches to at least one of said plurality of traces.

5. A keyboard, as claimed in claim 4, wherein said circuit board is curved along two orthogonal axes.

6. A keyboard comprising:

a chassis having means for positioning a plurality of user-activatable keys in a predetermined configuration, at least some keys having electrical contacts, said contacts being non-planar over at least two non-parallel axes;

a bowl-shaped circuit board, having predetermined electrical traces, and having substantially non-overlapping means for coupling said electrical contracts of said keys to said predetermined electrical traces.

7. A keyboard, as claimed in claim 6, wherein said circuit board includes a flexible substrate means for substantially conforming at least a portion of said circuit board means to a configuration adjacent at least some of said electrical contacts.

8. A keyboard, as claimed in claim 6, wherein said circuit board includes slot means separating a first region of said circuit board means from a second region of said circuit board, permitting said first region to be positioned in a configuration non-coplanar with said second region.

9. A keyboard, as claimed in claim 6, wherein said user-activatable keys comprise mechanical key switches.

10. A keyboard, as claimed in claim 6, wherein said user-activatable keys comprise membrane switches.

11. A keyboard, as claimed in claim 6, wherein said means for coupling comprises means for providing a solder connection to said key switches.

12. A keyboard, as claimed in claim 6, wherein said means for coupling comprises means for solderless connection to said key switches.

13. A method for providing electrical connection to a plurality of keys in a chassis, comprising:

providing a plurality of user-activatable keys, at least some keys having electrical contacts;

providing a circuit board having a plurality of electrical traces;

coupling said electrical contacts with at least some of said plurality of electrical traces;

placing said circuit board in a configuration which is non-linear over a first axis in a first region of said circuit board;

placing said circuit board in a configuration which, in said first region, is non-linear over a second axis, non-parallel with said first axis to provide a substantially bowl-shaped configuration.

14. A method, as claimed in claim 13, wherein:

said step of providing a circuit board comprises providing a circuit board which is flexible in at least a first region; and wherein said step of placing said circuit board in a configuration which is non-linear over a first axis comprises bending at least said first region into a configuration which is curved along said first axis.

15. A method, as claimed in claim 13, wherein:

said step of providing a circuit board comprises providing a circuit board which includes at least a first slot separating a first portion from a second portion; and wherein said step of placing said circuit board in a configuration which is non-linear over a second axis comprises positioning said first and second portions in non-coplanar, substantially non-contacting configurations.

16. A method, as claimed in claim 15, wherein said step of positioning said first and second portions comprises bending said first portion to a curved configuration substantially along a first arc and bending said second portion to a curved configuration substantially along a second arc, different from said first arc.

17. A method, as claimed in claim 16, wherein said first arc has an approximate radius of curvature greater than the approximate radius of curvature of said second arc.

18. A method, as claimed in claim 16, wherein:

said step of providing a circuit board comprises providing a circuit board which is flexible in at least a first region; and wherein said step of placing said circuit board in a configuration which is non-linear over a first axis comprises bending at least said first region into a configuration which is curved along said first axis.

19. A method, as claimed in claim 16, wherein at least said first portion has a substantially linear cross-section along a third axis, substantially parallel with said first axis.

20. A method, as claimed in claim 16, wherein at least said first portion has a curved cross-section along a third axis, substantially parallel with said first axis.

21. A method, as claimed in claim 13, further comprising:

providing a region of said chassis with a plurality of holes configured to accommodate said keys and positioning said keys in said holes.

22. A method, as claimed in claim 21, wherein said step of providing a region of said chassis with a plurality of holes comprises coupling a non-integrally formed plate, having said holes formed therein, to said chassis.

23. A method, as claimed in claim 21, wherein said step of providing a region of said chassis with a plurality of holes comprises forming said holes in said chassis.

24. A method, as claimed in claim 21, wherein said chassis has an interior surface and an exterior surface and further comprising positioning said keys in said holes by pushing said keys partially through said holes in a direction from said interior toward said exterior surface.

25. A method, as claimed in claim 21, wherein said chassis has an interior surface and an exterior surface and further comprising positioning said keys in said holes by pushing said keys partially through said holes in a direction from said exterior toward said interior surface.

26. A method, as claimed in claim 22, wherein said plate has an upper and a lower surface, further comprising:

pushing the keys partially through said holes in a direction form said lower surface toward said upper surface; and wherein said step of positioning said circuit board comprises positioning said circuit board substantially adjacent said lower surface of said plate.

27. A method, as claimed in claim 22, wherein said plate has an upper and a lower surface, further comprising:

pushing the keys partially through said holes in a direction from said upper surface toward said lower surface; and wherein said step of positioning said circuit board comprises positioning said circuit board substantially adjacent said lower surface of said plate.

28. A method as claimed in claim 15, wherein said step of providing a circuit board which includes at least a first slot is performed before said step of coupling said electrical contacts.

29. A method as claimed in claim 13, wherein said step of coupling said electrical contacts is performed before either said steps of placing said circuit board in a configuration.

30. A method as claimed in claim 13, wherein said step of coupling said electrical contacts includes coupling said electrical contacts while said circuit boards is in a substantially flat configuration.

31. A method as claimed in claim 13, wherein said plurality of user activatable keys are held in a substantially stable position by the mutual coupling of both the circuit board and said region of said chassis to said plurality of user-activatable keys.

32. A method as claimed in claim 24, further comprising positioning said keys using a snap action mechanism.

33. A method as claimed in claim 25, further comprising positioning said keys via a snap action mechanism.

* * * * *